United States Patent
Bashkirov et al.

(10) Patent No.: US 10,653,943 B2
(45) Date of Patent: *May 19, 2020

(54) VARIABLE MAGNETIC FIELD-BASED POSITION

(71) Applicant: Sony Interactive Entertainment Inc., Tokyo (JP)

(72) Inventors: Sergey Bashkirov, San Mateo, CA (US); Takeo Matsukawa, San Mateo, CA (US); Jeffrey R. Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,204

(22) Filed: Dec. 11, 2018

(65) Prior Publication Data
US 2019/0105558 A1    Apr. 11, 2019

Related U.S. Application Data

(63) Continuation of application No. 15/402,539, filed on Jan. 10, 2017, now Pat. No. 10,155,154.

(51) Int. Cl.
| A63F 13/211 | (2014.01) |
| A63F 13/21 | (2014.01) |
| A63F 13/428 | (2014.01) |
| G06F 3/01 | (2006.01) |
| G06F 3/0346 | (2013.01) |
| A63F 13/5255 | (2014.01) |

(52) U.S. Cl.
CPC .......... *A63F 13/21* (2014.09); *A63F 13/428* (2014.09); *A63F 13/5255* (2014.09); *G06F 3/012* (2013.01); *G06F 3/0346* (2013.01)

(58) Field of Classification Search
CPC .. A63F 9/24; A63F 13/02; A63F 13/04; A63F 13/06; A63F 13/12; A63F 13/20; A63F 13/21; A63F 13/211; A63F 13/212; A63F 13/22; A63F 13/23; A63F 13/25; G01R 33/00; G01C 21/08

See application file for complete search history.

(56) References Cited

U.S. PATENT DOCUMENTS

| 4,298,874 A | 11/1981 | Kuipers |
| 5,347,289 A | 9/1994 | Elhardt |
| 6,064,202 A | 5/2000 | Steiner et al. |
| 8,311,767 B1 * | 11/2012 | Stetson ................ G01R 33/032 702/152 |
| 2011/0043197 A1 | 2/2011 | Trontelj |

(Continued)

*Primary Examiner* — Omkar A Deodhar
(74) *Attorney, Agent, or Firm* — John L. Rogitz

(57) ABSTRACT

To derive three dimensional (3D) position and orientation of a 3-axis (or more) magnetometer/accelerometer device (such as may be implemented in VR or AR headset or computer game controller) without line of sight constraints, a spinning magnetic field is used to discriminate and remove the external (Earth's) magnetic field from the spinning magnetic field. This reduces the problem to finding the distance to the source of the magnetic field using a calibration table (or formula), finding two angles describing the deviation of the magnetic sensor from the axis of rotation of the spinning magnetic field and the phase around this axis, and from these values deriving the orientation of the sensor.

20 Claims, 8 Drawing Sheets

(56) References Cited

U.S. PATENT DOCUMENTS

| | | |
|---|---|---|
| 2014/0051518 A1 | 2/2014 | Russo |
| 2014/0247039 A1 | 9/2014 | Duan et al. |
| 2016/0246369 A1 | 8/2016 | Osman |

* cited by examiner

Step 1: Find External Field

Step 2: Find "r" Distance to Magnet

Step 3: Find Phase Angle

VARIABLE MAGNETIC FIELD-BASED POSITION

FIELD

The application relates to technically inventive, non-routine solutions that are necessarily rooted in computer technology and that produce concrete technical improvements.

BACKGROUND

Knowing the "pose" (location and orientation) of various objects can be useful in many computer applications. As but one example, computer games such as virtual reality (VR) or augmented reality (AR) games are sometimes designed to receive, as input, pose information from a VR/AR headset worn by a player, or pose information of a hand-held device such as a computer game handset.

Current positioning solutions sometimes rely on visual tracking of objects with a video camera or laser beam to track the pose of objects of interest. These technologies require sensor device to be within line of sight of the object for light to be able to travel towards device without meeting obstacles.

SUMMARY

As understood herein, the line of sight between the light sensor and the object of interest may be blocked. As also understood herein, magnetic fields are immune to blockages of line of sight. It is therefore desirable to derive three dimensional (3D) position and orientation of a 3-axis (or more) magnetometer/accelerometer device without line of sight constraints. In the examples below, a rotating magnetic field such as may be generated by spinning magnet or plural pulsed electromagnets is used to separate the external (Earth's) magnetic field and the generated magnetic field and reduce the problem to finding the distance to the field source using a calibration table (or formula), finding two angles describing the deviation of the magnetic sensor from the axis of rotation of the spinning magnet and the phase around this axis, and from these values deriving the position of the sensor.

Accordingly, a method includes rotating a magnetic field, and using at least one sensor near the field source, sensing magnetic field strength during at least one complete revolution of the magnet. The method includes summing plural values from the sensor over the at least one revolution to render a sum, determining a mean of the sum, and subtracting the mean of the sum from at least some of plural magnetic field values sensed by the sensor during at least one complete revolution of the magnet to render adjusted values. The adjusted values are squared to render squared adjusted values, and based on a minimum one of the squared adjusted values, a distance is determined. The method further includes integrating the squared adjusted values to render integrated squared adjusted values and based on a maximum one of the integrated squared adjusted values, determining at least a first angle. The distance and the at least first angle are converted to Cartesian coordinates which are used to determine at least one aspect of a pose of an object coupled to the field source.

Alternatively, data readings in covariance matrix are calculated and two of the biggest (of three total) eigenvalues are used to calculate the same values. Assuming eigenvalues are ev1, ev2, ev3, r~ev2 and sin(gamma)~ev1, ev2, r.

In some examples, the method includes, based on the distance and the first angle, determining a second angle, and converting the distance, the first angle, and the second angle to Cartesian coordinates. The at least one aspect of the pose of the object can be input to a computer program such as a computer game.

In examples, the method further includes using the Cartesian coordinates, the mean of the sum, and the Earth's gravity vector, determining the at least one aspect of the pose of the object. This can specifically entail determining a first auxiliary vector by obtaining a cross product of the Earth's magnetic field and the Earth's gravity vector, and determining a second auxiliary vector by obtaining a cross product of the gravity vector and the first auxiliary vector. A matrix may be constructed using the first and second auxiliary vectors and the gravity vector and used to convert the aspect of pose information from a first reference frame to the Earth's reference frame. If desired, the gravity vector and first and second auxiliary vectors may be normalized (converted to the same units) before constructing the matrix such that columns of the matrix include normalized vectors.

In non-limiting examples, the object for which pose information is derived is a headset wearable by a person, or a game controller manipulable by a person.

In another aspect, a computer storage that is not a transitory signal includes instructions executable by at least one processor for receiving, from at least one sensor, plural magnetic field signals induced by a spinning magnetic field. The plural magnetic field signals are from a complete rotation of the magnetic field. The instructions are executable for determining a distance to the magnetic field source based on at least one of the plural magnetic field signals, determining first and second angles based on at least one of the plural magnetic field signals, and deriving an orientation of the sensor based on the distance and the first and second angles.

In another aspect, a computer game device includes at least one magnetic field source configured for producing a rotating field and at least one sensor configured for sensing the magnetic field. The sensor is configured for providing input to at least one processor configured for executing instructions to receive, from the sensor, plural magnetic field signals. The plural magnetic field signals are from a complete rotation of the magnetic field. The processor when executing the instructions determines a distance to the magnetic field source based on at least one of the plural magnetic field signals, as well as first and second angles based on at least one of the plural magnetic field signals. The processor when executing the instructions derives an orientation of the sensor based on the distance and the first and second angles.

As alluded to above, a series of electro-permanent magnets may be used instead of a single spinning permanent magnet. The electro-permanent magnets can be turned on and off in series to simulate a quantized spinning magnetic field. Also magnetic background readings can be taken while all the electro-permanent magnets are turned off to improve the filtering of unwanted magnetic fields.

The details of the present application, both as to s structure and operation, can best be understood in reference to the accompanying drawings, in which like reference numerals refer to like parts, and in which:

DETAILED DESCRIPTION

Figure 1:
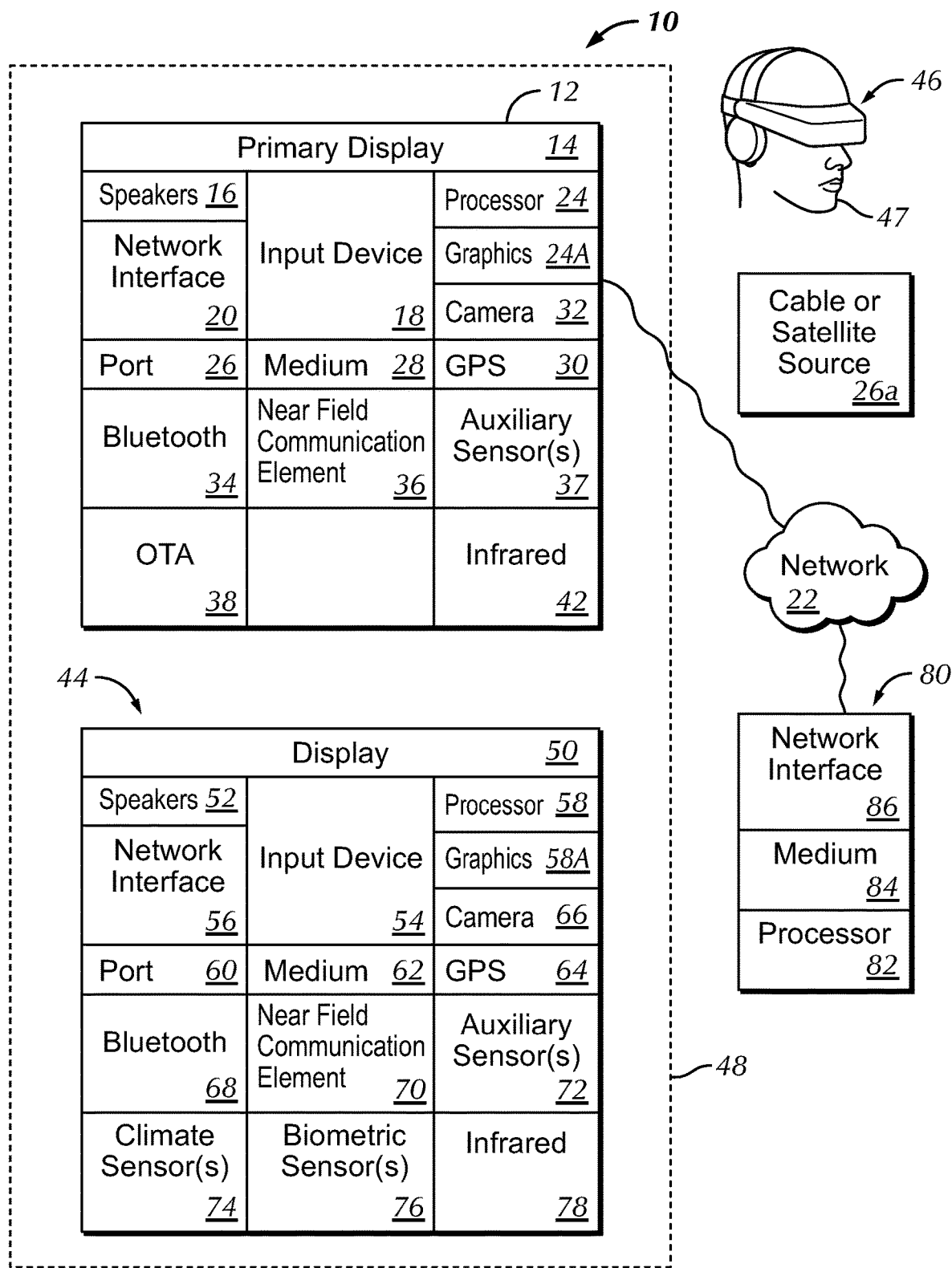
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various b-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element, Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first GE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured Advanced RISC Machine (ARM) microcontroller, an application specific integrated circuits (ASIC) or field programmable gate array (FPGA) modules, or any other convenient manner as would be appreciated by those skilled in those art. For example, a real time operating system (RTOS) microcontroller may be used in conjunction with Linus or Windows-based computers via USB layers. Where employed, the software instructions may be embodied in a non-transitory device such as a CD ROM or Flash drive. The software code instructions may alternatively be embodied in a transitory arrangement such as a radio or optical signal, or via a download over the internet.

In general, present principles use a magnetic field map to determine and/or predict magnetic sensor position and orientation with respect to a magnetic field source. An external magnetic dipole-like magnetic field may be used to determine position and orientation of a 9-axis sensor. In the discussion below, the magnetic dipole field is described by the following equation:

$$\vec{B} = \frac{|\vec{m}|}{|r|^3}\left(3\frac{(\vec{m},\vec{r})\vec{r}}{|r|^5} - \frac{\vec{m}}{|r|^3}\right),$$

where $\vec{B}$ resultant magnetic field at point at the end of the vector $\vec{r}$, with the magnet's magnetic moment being $\vec{m}$.

Figure 2:
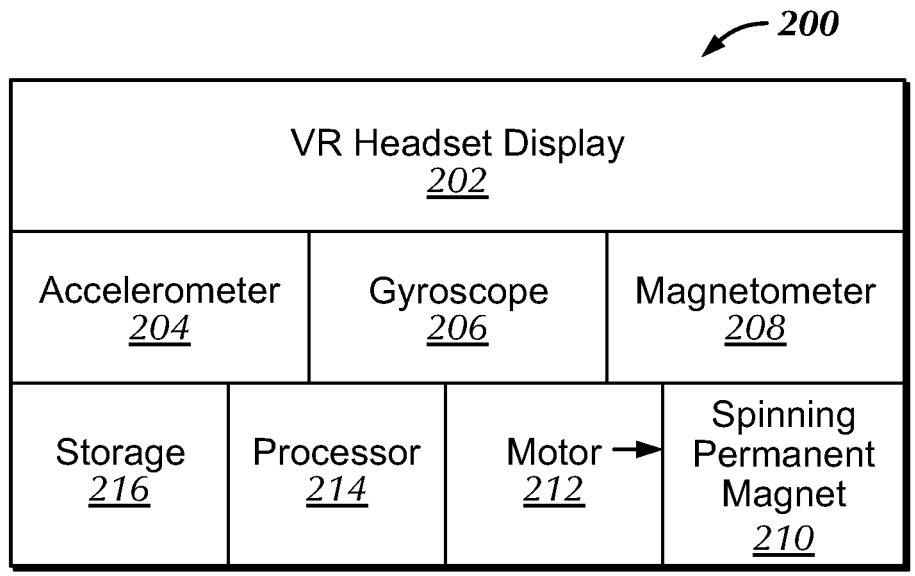
FIG. 2 is a block diagram of example pose-sensing components of an example object whose pose information is to be tracked.

FIG. 2 shows an example assembly 200 that may be incorporated into an object such as but not limited the object 47 in FIG. 1, e.g., a VR/AR headset or a hand-held computer game controller, to determine pose information related to the object and to send that pose information to, e.g., a computer game as input to the game. "Pose information" typically can include location in space and orientation in space.

When the assembly 200 is incorporated into a headset, it may include a headset display 202 for presenting demanded images, e.g., computer game images. The assembly 200 may also include an accelerometer 204 with three sub-units, one each for determining acceleration in the x, y, and z axes in Cartesian coordinates. A gyroscope 206 may also be included to, e.g., detect changes in orientation over time to track all three rotational degrees of freedom. While the assembly 200 may exclude the accelerometer 204 (and/or gyroscope 206) and rely only on the below-described magnetometer 208, the accelerometer 204 (and/or gyroscope 206) may be retained as it is very fast compared to the magnetometer. Retaining these sensors further can be used as described further below to improve performance and precision using sensor fusion.

The magnetometer 208 typically includes a magnetic field sensor. In addition to in lieu of a magnetometer sensor per se, the sensor may be implemented by a Hall effect sensor or other appropriate magnetic field sensor. However the sensor is physically embodied, it measures the magnetic field generated by a spinning permanent magnet 210 such as a horseshoe-shaped, bar-shaped, or other appropriately shaped magnet implemented by Iron or a rare earth material such as Neodymium. For example, the magnet 210 may be made of neodymium iron boron (NdFeB), or samarium cobalt (SmCo), or alnico, or ceramic, or ferrite.

To spin the magnet 210 about an axis, a motor 212 is coupled to the magnet. A processor 214 accessing instructions on a computer memory 216 may receive signals from the magnetometer 208, accelerometer 204, and gyroscope 206 and may control the motor 212 and display 202 or feed pose data to different consumers, e.g., partner garners. The processor 214 may execute the logic below to determine aspects of pose information using the signals from the magnetometer and may also communicate with another computer such as but not limited to a computer game console using any of the wired or wireless transceivers shown in FIG. 1 and described above, including communication of the pose information to the other computer. In some embodiments the data from the magnetometer may be uploaded to a remote processor that executes the logic below.

Figure 3:
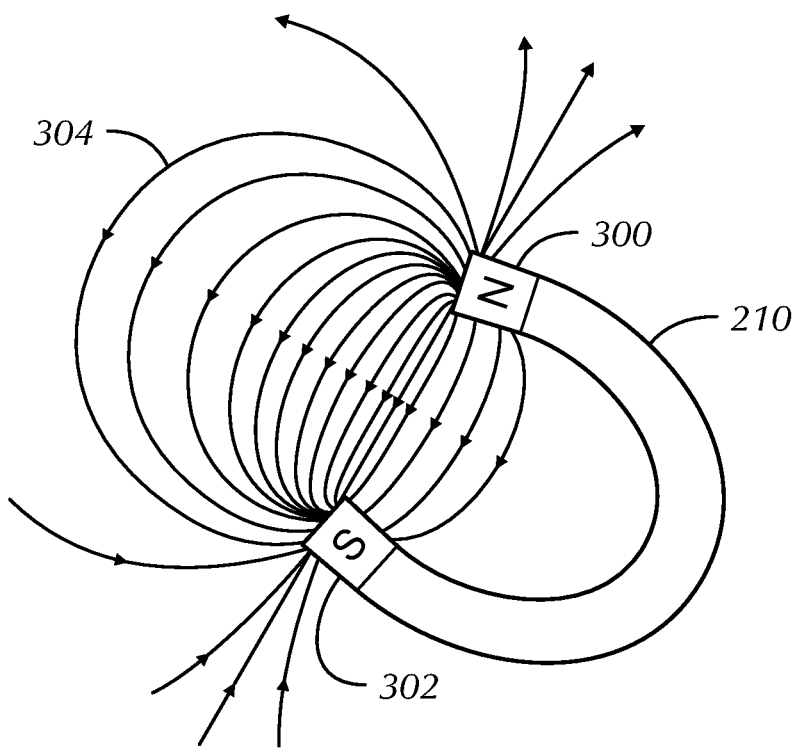
FIGS. 3-7 are schematic diagrams of an example spinning permanent magnet illustrating aspects of the magnetic field and various variables discussed in relation to the process herein.

FIG. 3 shows a horseshoe-shaped embodiment of the magnet 210, with a north pole 300 and a south pole 302 and a magnetic field 304 between the poles. FIG. 3 shows an example in which the magnetic field is 304 is symmetric, i.e., the magnetic field exhibits plane symmetry. In the case when magnetic field is symmetric it is in addition possible to directly obtain the external magnetic field by simply integrating magnetometer readings. Alternatively, sensor fusion can be used in order to get external magnetic field. In the last case magnetic field empiric formulas are used in order to match measured versus calculated sensor readings. Because the magnetic field is concentrated near the magnet poles, and even in the case of a strong neodymium magnet the field decays relatively rapidly with distance from the poles, if desired one or more magnetic conductors may be used to expand the magnetic field and make it less concentrated near the poles.

As mentioned above, that strict symmetry isn't required. While advantageous, since it is possible when symmetry is present to obtain the external magnetic field explicitly by just integration, in the case of an asymmetric field it is still possible to obtain the external field by applying sensor fusion as described more fully below and having the external field as system state variables.

Figure 4:
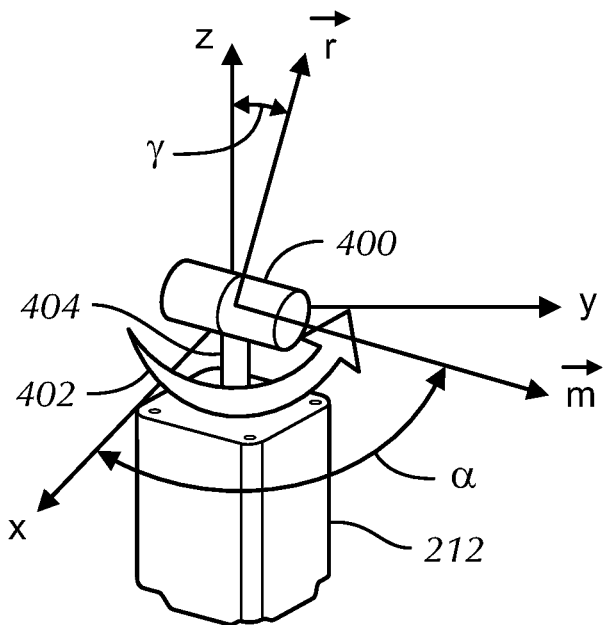

FIG. 4 shows the magnet in a bar-shaped embodiment 400 which is spun, in the example shown in the horizontal plane, in the direction of the arrow 402 by the motor 212, a central shaft or axle 404 of which is coupled to the magnet 400. In FIG. 4, various parameters discussed further below are illustrated. The three Cartesian axes are shown, and the vector "r" mentioned above is illustrated. The magnet's magnetic moment vector $\vec{m}$ also is shown. The magnet's orientation angle α describing the orientation in X-Y plane of magnetic moment vector $\vec{m}$ (defined by the south-north magnet's axis direction) and the x-axis also is shown. In FIG. 4, the magnet 400 is laying in (X, Y) plane. The observation point at which the magnetic field is sensed is described by the distance of the observation point from the origin (given by the vector r) and angle γ by which the vector r is offset from the z-axis. Without restricting the generality it is assumed in the formulas below that the observation point is within the Y-Z plane.

The magnetic field at the end of the vector r is given by:

$$\vec{B} = \frac{m}{r^3}\left(3\sin(\alpha)\sin(\gamma)\begin{bmatrix}0\\\sin(\gamma)\\\cos(\gamma)\end{bmatrix} - \begin{bmatrix}\cos(\alpha)\\\sin(\alpha)\\0\end{bmatrix}\right).$$

As described further below, the magnet performs one complete revolution around the z-axis and the integral of $\vec{B}$ over one revolution is obtained as follows:

$$\int_0^{360}\vec{B} = \int_0^{360}\frac{m}{r^3}\left(3\sin(\alpha)\sin(\gamma)\begin{bmatrix}0\\\sin(\gamma)\\\cos(\gamma)\end{bmatrix} - \begin{bmatrix}\cos(\alpha)\\\sin(\alpha)\\0\end{bmatrix}\right)d\alpha = \begin{bmatrix}0\\0\\0\end{bmatrix}.$$

In other words, by summing up all magnetic field values over one complete revolution, the sum should equal zero if the only magnetic field being sensed were generated entirely by the magnet, when in reality part of the sensed field is the Earth's magnetic field. This means that by summing up all real word field values over one revolution of the magnet, it is possible to cancel out magnet's field and get only external magnetic field value by obtaining the mean of the result as described further below.

Figure 5:
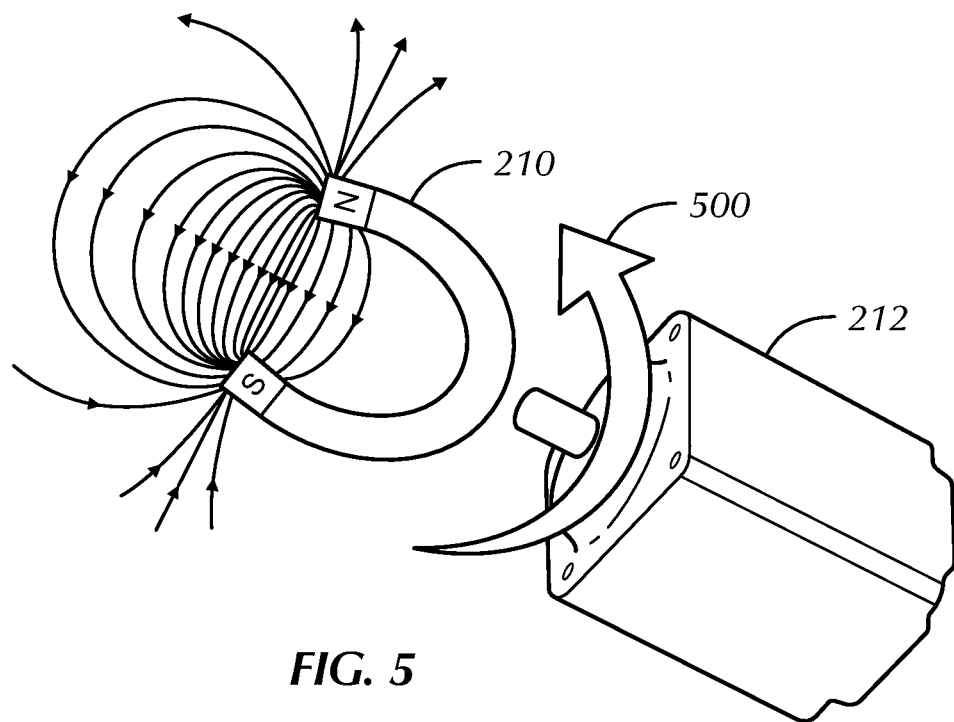
Figure 6:
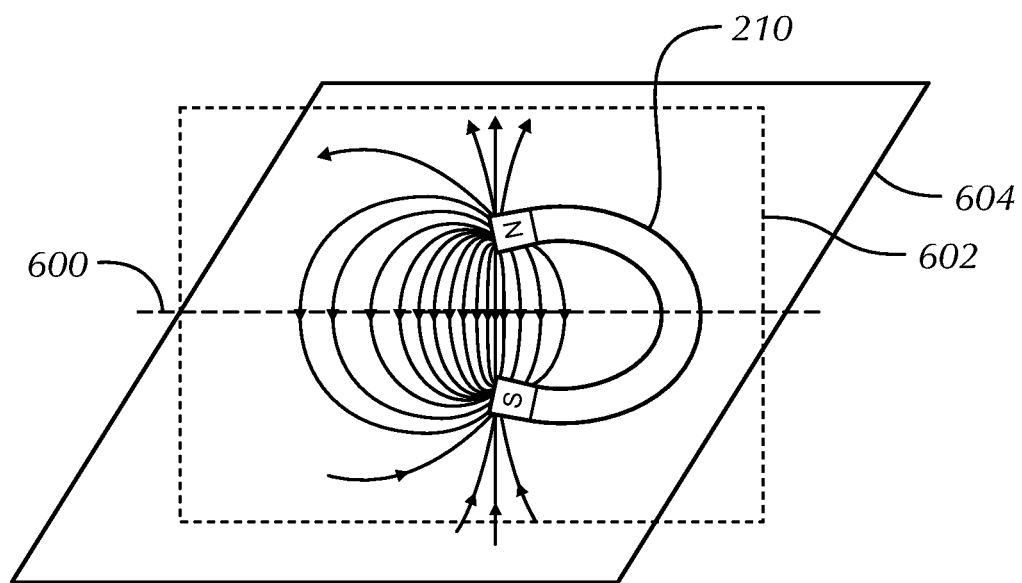

However, before describing further details of operation, additional illustration of the spinning magnet is shown in FIGS. 5 and 6, showing the spinning magnet 210 with its spin axis 600 (about which the arrow 500 extends) coinciding with the intersection of the symmetry planes 602, 604 of the field generated by the magnet.

Further description of the result mentioned above is now provided.

Figure 7:
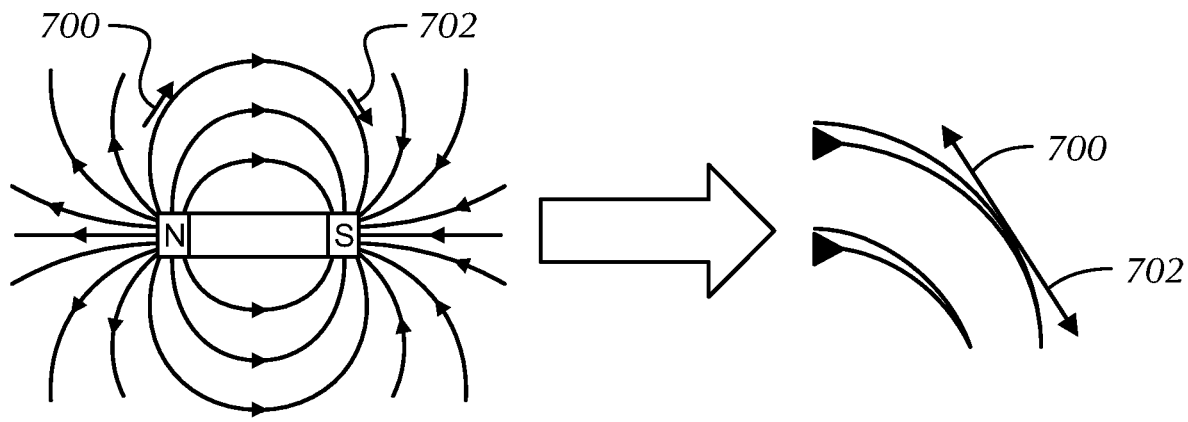

FIG. 7 further illustrates the symmetry properties shown in FIGS. 5 and 6. Each of two points that are symmetrical relative to the rotation axis of the magnet correspond to the magnetic field vectors 700, 702. If the magnetic sensor is located at the origin of the first vector 700, after 180 degrees of rotation the second vector 702 arrow assumes the same location as the first vector 700 previously held because the second vector in turn also rotated 180 degrees, becoming the same as the first vector 700 in magnitude but opposite in direction. Because of this symmetry, if all field values are summed up during one revolution, the sum should be the zero vector (plus any external constant magnetic field).

Figure 8:
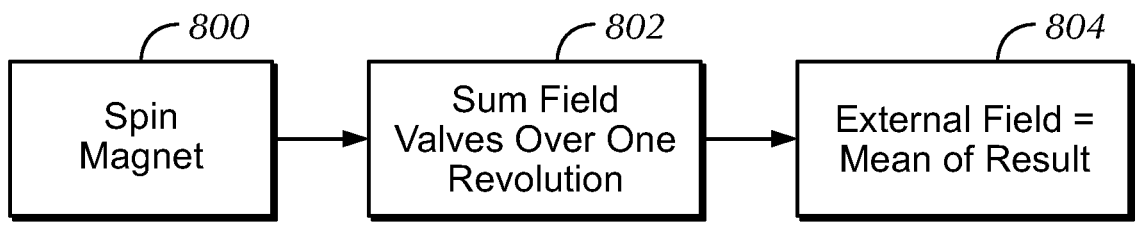
FIG. 8 is a flow chart of example logic for determining the external magnetic field.
Figure 9:
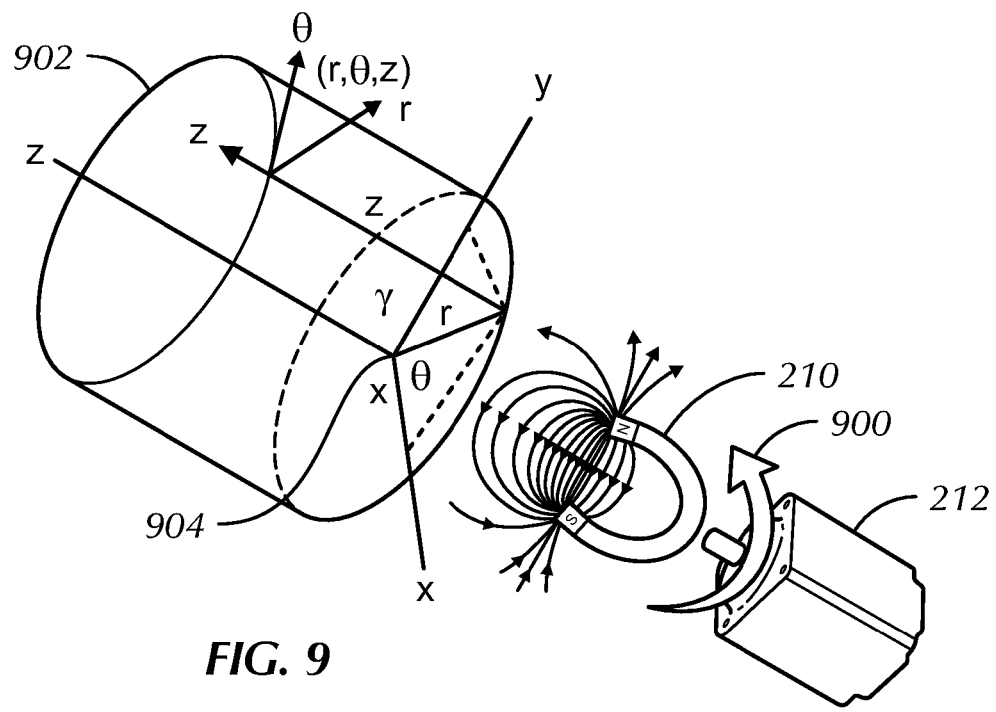
FIG. 9 is a schematic diagram of an example spinning permanent magnet illustrating aspects related to the logic of FIG. 8.

Turn now to FIGS. 8 and 9 for an explanation of the first step in the example determination of pose information. Commencing at block 800 in FIG. 8, the magnet 210 shown in FIG. 9 is spun by the motor 212 as indicated by the arrow 900. Proceeding to block 802, sensor measurements over a complete revolution of the magnet are obtained and summed. As discussed above, assuming the axis of rotation of the magnet is at or relatively close to the intersection of the symmetry planes of the magnet, this sum should produce the zero vector, meaning that the mean of a real world non-zero result represents the Earth's magnetic field. This result is obtained at block 804 of FIG. 8 by dividing the real world non-zero result by the number of measurement samples per revolution. Essentially, the magnetometer (or other magnetic sensor) readings over one revolution are integrated to obtain the external magnetic field.

For illustration purposes, FIG. 9 also shows a cylindrical coordinate system 902 superimposed on a Cartesian coordinate system 904 for conversion purposes to be shortly disclosed.

Figure 10:
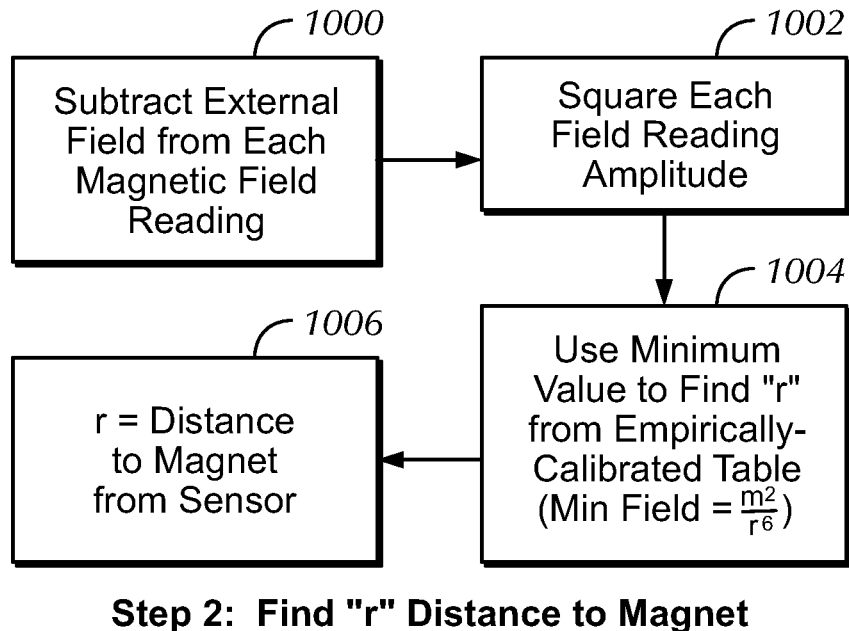
FIG. 10 is a flow chart of example logic for determining "r", the distance to the magnet.

FIG. 10 shows that at block 1000, the external field determined at block 804 of FIG. 8 is subtracted from each magnetic field reading over the entire revolution of the magnet. In an example, magnetic field readings are sensed for every degree of rotation, so that 360 total readings are obtained for a complete revolution, it being understood that greater or fewer readings may be obtained for a revolution.

Proceeding to block 1002, the amplitude of each field reading after adjusting for the mean field value is squared, and the minimum value (or second eigenvalue when used according to description below) from among the squares is selected to derive the distance "r" at block 1004 from the sensor to the magnet. This may be done by finding the appropriate point on a calibration value of a distance curve (or using empirical formula, see further explanation). Since it is not expected that the real world magnet will exactly match a magnetic dipole's model magnetic field, either interpolated table values that are empirically determined through experimental measurement or an empirical formula may be used to find "r". For example, at block 1004 in FIG. 10, "r" may be obtained from the minimum value among the measured field strengths B by setting the minimum $B=m^2/r^6$. The value of "r" from block 1004 is set to be the distance from the magnet to the sensor at block 1006.

Figure 11:
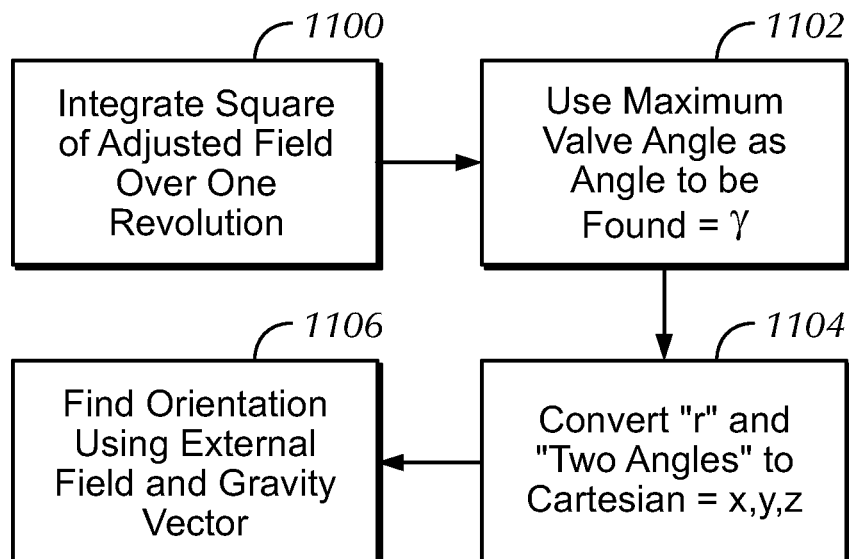
FIG. 11 is a flow chart of example logic for determining the phase angle and subsequent determination of pose information.

Having obtained the distance "r", and now referring to FIG. 11, having a mapping of maximum magnetic field of (x, y) in magnet's symmetry plane only it is possible to determine the (x, y) position in magnet's reference frame.

At block 1100 the squares of the adjusted field values described above are integrated over one revolution. This step may be given by:

$$|\vec{B}|^2 = \frac{m^2}{r^6}(3\sin^2(\alpha)\sin^2(\gamma) + 1)$$

The integral over one revolution of magnetic field squared is $$\int_0^{360} B^2 d\alpha = \frac{m^2}{r^6}(3\pi\sin^2(\gamma) + 2\pi).$$

An example way to obtain γ and α is described further below.

Moving to block 1102, the result of the integration is used to derive the angle between the rotation axis of the magnet and the magnetometer position vector. Assuming that $$\frac{m^2}{r^6}$$

value is obtained at previous step it is possible to obtain sin(γ). More specifically, the phase angle γ (angle defining position around magnet's rotation axis) in the equation above can be determined by choosing the magnetic field maximum value (or maximum eigenvalue of magnet readings covariance matrix.) The angle of the magnet corresponding to this field value is the angle γ to be found.

That is, $m^2/r^6$ for all field values, including the maximum, is known, as is $m^2/r^6$ $(3\pi(\sin(\gamma))^2+2\pi)$ is known, $(3\pi(\sin(\gamma))^2+2\pi)$ is determined. Using this last equation, sin(γ) is determined and hence γ is determined. Thus, the orientation of the point of interest in the (X, Y) plane can be obtained by tracking the magnet's rotation phase by measuring the point in time at which the magnetic field is maximum.

With the values of (a) $m^2/r$ and (b) sin(γ) being known, and taking into account that at any point the magnetic field length squared is $m^2/r^6$ $(3(\sin(\gamma))^2(\sin(\alpha))^2+1)$ and by substituting a) and b) into this value, sin(α) and hence α itself is obtained. The only tradeoff is which magnetic field value over the whole revolution to take for the calculation, as it affects RF orientation with respect to external reference frame. In an example, this is fixed as follows. Assuming the magnetic field's rotation axis is chosen to be horizontal, a value of the magnetic field may be used which is perpendicular to the direction of gravity so that the angle α is determined from the horizontal direction.

Proceeding to block 1104, the values for "r", γ, and α are converted to Cartesian coordinates as follows:

$x=r\sin(\gamma)\cos(\alpha)$ $y=r\sin(\gamma)\sin(\alpha)$ $z=r\cos(\gamma)$

At block 1106 the orientation of the device containing the magnet is determined using the external magnetic field and the gravity vector. This is to convert the obtained coordinates from the magnet reference frame (RF) into the real world RF.

In one example, the process may be executed twice, first to apply it to the magnet's horizontal magnetic field (used to calculate α) and gravity and then to use the external field value and gravity vector to compute the transformation to world RF. Assuming that the matrices obtained as described below are B and A, the resultant transformation is $A*B^{-1}$. As transformation converts from magnet RF to sensor RF and A from sensor RF to world RF, the product converts from the magnet RF to the real world RF:

a) Get auxiliary vector which is a3=B×g (cross product of Earth magnetic field and gravity);

b) Get another auxiliary vector a1=g×a3 (cross product of gravity and previous auxiliary vector);

c) Normalize g, a1, and a3;

d) Compose matrix A=(a1 g a3), in which columns are a1, g and a3 are normalized vectors.

The result A is the orientation matrix converting from sensor RF to world RF.

Aspects of the pose information of the assembly 200 containing the magnet may then be communicated to, e.g., a computer game or other program as input for altering the game (or other program) according to the pose information of the object 200.

Understanding that the actual magnetic field of the magnet may be different from an ideal dipole magnetic field, in some implementations a two dimensional interpolation grid may be used to determine the exact position "r".

Furthermore, recognizing that the magnetic field decays as $1/r^3$ and the square thereof as $1/r^6$, logarithms of field values may be used instead of field values directly, because logarithms decay slower. This technique may be combined with fitting the measured field over one revolution by regression and getting the minimum value from the regression formula such as: r~exp(regression_expression(log (|B|)).

Figure 12:
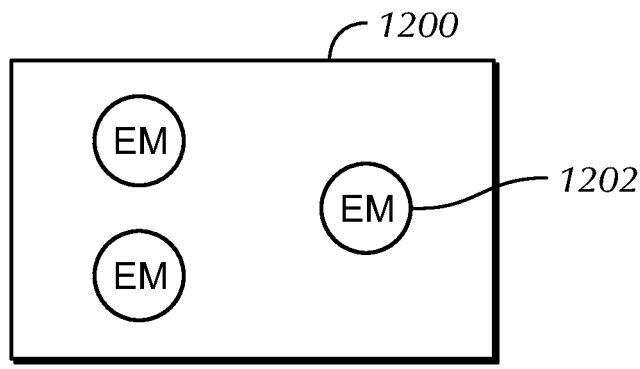
FIG. 12 is a schematic diagram of an alternate system that uses stationary electromagnets to generate a rotating magnetic field.

FIG. 12 illustrates that instead of using a spinning permanent magnet to generate a rotating magnetic field, a device 1200 such as a VR headset or hand-held game controller or other device may use multiple stationary electro-permanent magnets 1302. The series of electro-permanent magnets may be used instead of a single spinning permanent magnet. The electro-permanent magnets can be turned on and off in series to simulate a quantized spinning magnetic field. Also magnetic background readings can be taken while all the electro-permanent magnets are turned off to improve the filtering of unwanted magnetic fields.

Figure 13:
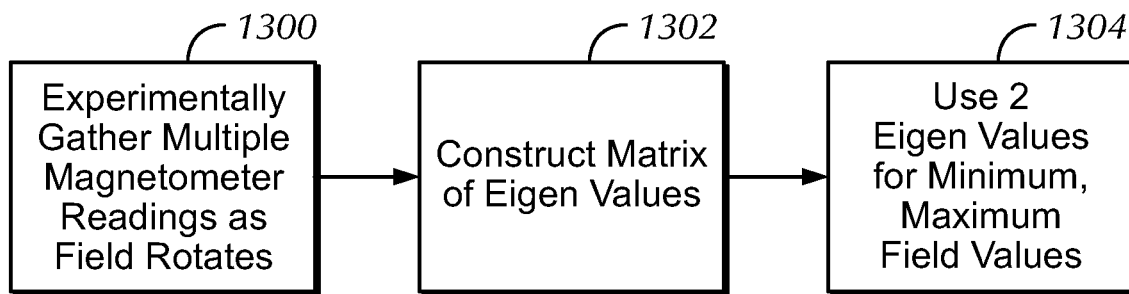
FIG. 13 is a flow chart of alternate logic that uses eigenvalues from an empirically determined matrix for the maximum and minimum field values.

FIG. 13 illustrates alternate logic that may be employed. At block 1300 multiple magnetometer readings are experimentally gathered as the magnetic field rotates. This may be done as follows.

Figure 16:
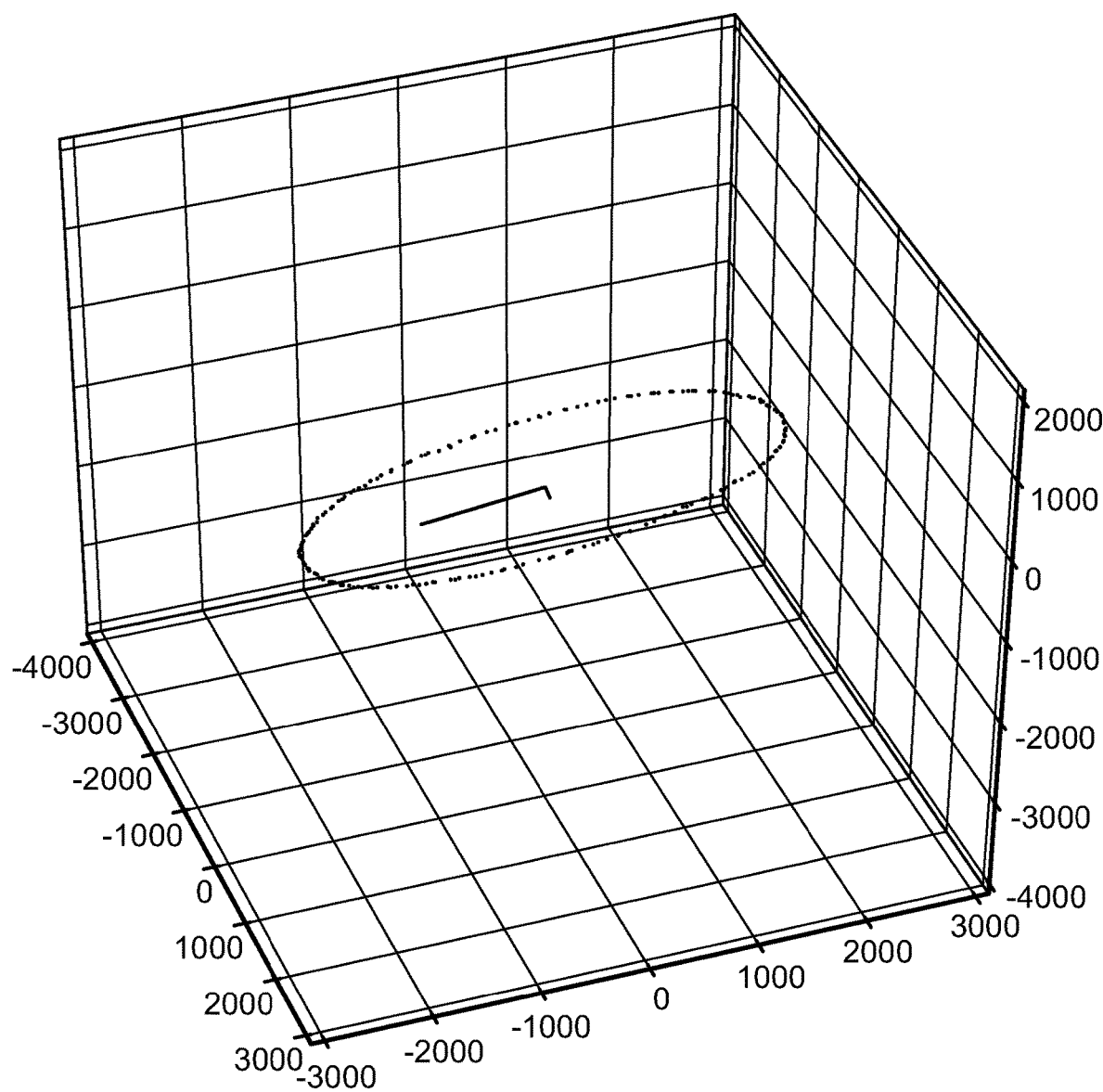
FIG. 16 is a graph showing the output of the sensor when constructing a covariance matrix according to FIGS. 13-15.

Experiments are done in the following way. A stationary magnetic sensor is exposed to a spinning magnetic field and all sensor readings are analyzed. A typical image of the output of the sensor over a complete revolution of the magnetic field is shown in FIG. 16.

The covariance is calculated in the following way. A mean field value "$B_{mean}$" is calculated first. Designating A as the covariance matrix then its Aij component is calculated in the following way:

$$Aij = \frac{1}{2\pi}\int_0^{2\pi} (B - Bmean)i(B - Bmean)j d\alpha,$$

where "I" and "j" are subscripts denoting the respective $i^{th}$ and $j^{th}$ differences indicated in the integral and the magnetic field values "B" are vector values.

$$A_{ij} = \int_0^{2\pi} (\vec{B} - \vec{B}_{mean})_i (\vec{B} - \vec{B}_{mean})_j d\alpha$$

$\vec{B}$ and $\vec{B}_{mean}$ are vector values and "i" and "j"=1 ... 3 are vector component indices.

Next, the magnetic field recorded during one revolution is plotted and as shown in FIG. 16 typically has an elliptical shape. The largest eigenvalue, eigenvector corresponds to the largest dimension of magnetic field plot shape (major axis of the ellipse). A middle eigenvector, eigenvalue corresponds to the smallest dimension of that plot shape (minor axis of the ellipse). And the smallest eigenvalue, eigenvector correspond to the shape's plane normal.

Thus, the ellipse-like magnetic field output graph in FIG. 16 is characterized by the biggest and the smallest dimensions. Both the maximum and minimum field absolute eigenvalues and the maximum and middle eigenvalues characterize magnetic fields figure's aspect ratio and size. Because of that it is possible to use either the minimum and maximum absolute field values or a pair of eigenvalues. Specifically, assuming the eigenvalues are ev1, ev2, ev3, in the preceding equations, r~ev2 and sin(γ)~ev1, ev2, r Note that because the determination of the eigenvalues calculation, which involves all of the magnetic field readings for a complete revolution of the field, a relatively precise determination of "r" and "gamma" can be made.

Thus, at block 1302, a covariance matrix is constructed from the readings as described above, and at block 1304 two of the three eigenvalues from the matrix are used for the minimum and maximum field values over one revolution of the field.

Figure 14:
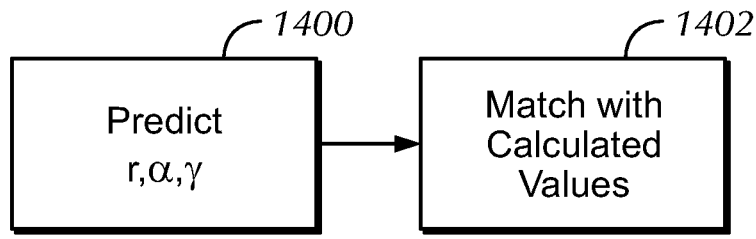
FIGS. 14 and 15 are flow charts of example logic that employs predicted pose information.

Instead of directly deriving r, γ and α, sensor fusion can be used to continuously improve pose belief by matching sensor readings with sensor reading predictions made using values tables or empiric formulas. FIG. 14 shows that in a first aspect of this, at block 1400 predicted r, [ (sin [ (γ)) [ ^2 and [ (sin [ (α)) [ ^2 sin²(γ) and sin(α) are obtained and fused with the same values calculated from magnetic field integration at block 1402. Essentially, using what can be regarded as a basic Bayesian filter, at each time step two substeps are executed, namely, a prediction step and a correction step. The prediction step includes motion equations integration. In other words, having a current belief of position, speed, acceleration, orientation, and angular velocity, a new pose prediction is generated by, e.g., extrapolation. Then the correction step determines a new "pose belief", i.e., extrapolated values for what the new pose information will be, based on the predicted pose sensor readings. Then the correction step calculates sensor readings belief based on pose estimation from prediction step. This sensor readings "pose belief" is then compared to subsequent actual sensor readings. A pose correction is then calculated based on how much the sensor readings "pose belief" diverges from the actual sensor readings. Sensor readings estimation is compared to actual sensor readings and pose adjustment is calculated based on how much actual sensor readings diverge from estimation.

Figure 15:
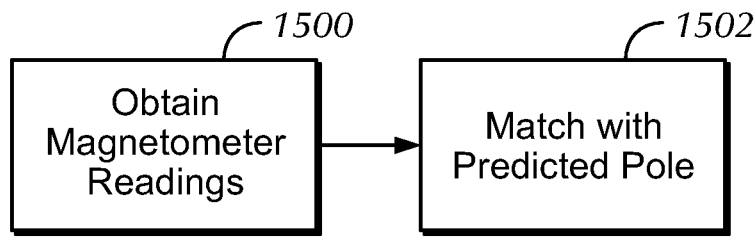

In contrast, FIG. 15 illustrates that an alternative way is to fuse direct magnetic sensor readings obtained at block 1500 with predicted sensor readings at block 1502 based on sensor current pose belief. That is, instead of fusing calculated distance "r" to magnetic field source and sin(γ) as described above, magnetic sensor readings are fused directly based on current pose belief.

It is to be understood that the logic of FIG. 14 may be more precise but slower while the process of FIG. 15 may be less precise but faster. So depending on precision/speed preference of the designer, the selection between FIGS. 14 and 15 may be made accordingly.

It will be appreciated that whilst present principals have been described with reference to some example embodiments, these are not intended to be limiting, and that various alternative arrangements may be used to implement the subject matter claimed herein.

What is claimed is:

1. A computer readable medium that is not a transitory signal and that comprises instructions executable by at least one processor for:

receiving a signal indicating magnetic field strength during at least one complete revolution of a magnetic field;

summing plural values indicated by the signals over the at least one revolution to render a sum;

determining a mean of the sum;

subtracting the mean of the sum from at least one magnetic field value during at least one complete revolution of the magnetic field to render an adjusted value;

based on the adjusted value, determining a distance;

using the adjusted value, determining at least a first angle;

converting the distance and the at least first angle to coordinates; and using the coordinates to determine at least one aspect of a pose of an object coupled to a source of the magnetic field.

2. The computer readable medium of claim 1, wherein the instructions are executable for:

based on the distance and the first angle, determining a second angle; and converting the distance, the first angle, and the second angle to Cartesian coordinates.

3. The computer readable medium of claim 1, wherein the instructions are executable for:

inputting the at least one aspect of the pose of the object to a computer program.

4. The computer readable medium of claim 3, wherein the computer program is a computer game.

5. The computer readable medium of claim 2, wherein the instructions are executable for:

using the coordinates, the mean of the sum, and the Earth's gravity vector, determining the at least one aspect of the pose of the object.

6. The computer readable medium of claim 5, wherein the instructions are executable for using the coordinates, the mean of the sum, and the Earth's gravity vector to determine the at least one aspect of the pose of the object at least in part by:

a) determining a first auxiliary vector by obtaining a cross product of the Earth's magnetic field and the Earth's gravity vector;

b) determining a second auxiliary vector by obtaining a cross product of the gravity vector and the first auxiliary vector;

c) constructing a matrix at least in part using the first and second auxiliary vectors and the gravity vector; and d) using the matrix to convert the aspect of pose information from a first reference frame to the Earth's reference frame.

7. The computer readable medium of claim 6, wherein the instructions are executable for:

normalizing the gravity vector and first and second auxiliary vectors before constructing the matrix.

8. The computer readable medium of claim 1, comprising the at least one processor and the object.

9. The computer readable medium claim 1, wherein the source of the magnetic field includes a spinning magnet.

10. The computer readable medium claim 1, wherein the source of the magnetic field includes a least one stationary electro-permanent magnet.

11. A computer storage that is not a transitory signal and that comprises instructions executable by at least one processor for:

receiving, from at least one sensor, plural magnetic field signals induced by a spinning magnetic field, the plural magnetic field signals being from a complete rotation of the magnetic field;

determining a distance to a source of the magnetic field based on at least one of the plural magnetic field signals;

determining first and second angles based on at least one of the plural magnetic field signals, at least the first angle being determined at least in part by subtracting a representation of a sum of values represented by the plural magnetic field signals from at least one of the values; and deriving an orientation of the sensor based on the distance and the first and second angles.

12. The computer storage of claim 11, wherein the first angle represents an orientation of the sensor relative to an axis of rotation of the magnetic field.

13. The computer storage of claim 11, wherein the second angle represents a phase around an axis of rotation of the magnetic field.

14. The computer storage of claim 11, wherein the source of the magnetic field and the sensor are coupled to a headset.

15. The computer storage of claim 11, wherein the source of the magnetic field and the sensor are coupled to a computer game controller.

16. The computer storage of claim 11, wherein the instructions are executable for:

converting the distance, the first angle, and the second angle to Cartesian coordinates.

17. The computer storage of claim 16, wherein the instructions are executable for:

using the Cartesian coordinates, a mean of a sum of the plural magnetic field signals, and the Earth's gravity vector, determining at least one aspect of a pose of an object coupled to the source of the magnetic field.

18. The computer storage of claim 16, wherein the instructions are executable for:

inputting the at least one aspect to a computer program.

19. A computer device comprising:

at least one source of a spinning magnetic field;

at least one sensor configured for sensing the magnetic field while it is spinning, the sensor configured for providing input to at least one processor configured for executing instructions to:

receive, from the at least one sensor, plural magnetic field signals, the plural magnetic field signals being from a complete rotation of the magnetic field;

determine a distance to the source of the magnetic field based on at least one of the plural magnetic field signals;

determine first and second angles based on at least one of the plural magnetic field signals;

derive an orientation of the sensor based on the distance and the first and second angles;

determining a first auxiliary vector by obtaining a cross product of the Earth's magnetic field and the Earth's gravity vector;

determining a second auxiliary vector by obtaining a cross product of the gravity vector and the first auxiliary vector; and using the first and second auxiliary vectors and the gravity vector to convert pose information associated with the orientation of the sensor from a first reference frame to the Earth's reference frame.

20. The computer device of claim 19, wherein the instructions are executable to:
   convert the distance, the first angle, and the second angle to coordinates;
   use the coordinates and the Earth's gravity vector to determine at least one aspect of a pose of the game device; and
   input the at least one aspect to a computer program.

* * * * *